(12) United States Patent
Medved

(10) Patent No.: US 9,424,534 B2
(45) Date of Patent: Aug. 23, 2016

(54) VOTING SYSTEM WITH CONTENT

(75) Inventor: Jonathan William Medved, Jerusalem (IL)

(73) Assignee: Infomedia Services Limited, Northampton (GB)

( * ) Notice: Subject to any disclaimer, the term of this patent is extended or adjusted under 35 U.S.C. 154(b) by 0 days.

(21) Appl. No.: 12/838,511

(22) Filed: Jul. 19, 2010

(65) Prior Publication Data

US 2011/0015970 A1   Jan. 20, 2011

Related U.S. Application Data

(60) Provisional application No. 61/226,718, filed on Jul. 19, 2009.

(51) Int. Cl.
| | | |
|---|---|---|
| G06F 21/00 | (2013.01) | |
| G06Q 10/00 | (2012.01) | |
| G07C 13/00 | (2006.01) | |

(52) U.S. Cl.
CPC ............... *G06Q 10/00* (2013.01); *G07C 13/00* (2013.01)

(58) Field of Classification Search
CPC ...................................... G06F 21/00
USPC .............................. 705/12, 15, 59
See application file for complete search history.

(56) References Cited

U.S. PATENT DOCUMENTS

| | | | |
|---|---|---|---|
| 5,970,385 A | | 10/1999 | Pykalisto |
| 7,657,223 B2* | | 2/2010 | Kauppinen ................ 455/3.03 |
| 7,813,724 B2* | | 10/2010 | Gronner et al. ............ 455/414.4 |
| 7,860,995 B1* | | 12/2010 | Singh et al. .................. 709/231 |
| 2003/0233274 A1* | | 12/2003 | Urken et al. .................... 705/12 |
| 2005/0258938 A1* | | 11/2005 | Moulson ...................... 340/7.58 |
| 2006/0031428 A1* | | 2/2006 | Wikman ........................ 709/220 |
| 2006/0072721 A1* | | 4/2006 | Wisniewski ................ 379/88.22 |
| 2006/0230415 A1* | | 10/2006 | Roeding ................ H04N 7/173 725/34 |
| 2006/0239131 A1* | | 10/2006 | Nathan et al. ............. 369/30.06 |
| 2007/0028272 A1* | | 2/2007 | Lockton ........................ 725/62 |
| 2007/0112648 A1* | | 5/2007 | Martin ........................... 705/27 |
| 2007/0129062 A1* | | 6/2007 | Pantalone et al. .......... 455/414.1 |
| 2007/0155411 A1 | | 7/2007 | Morrison |
| 2007/0274496 A1* | | 11/2007 | Singh et al. .............. 379/210.02 |
| 2008/0004946 A1* | | 1/2008 | Schwarz ................ G06Q 10/10 705/12 |
| 2008/0195593 A1* | | 8/2008 | Harju et al. ....................... 707/5 |
| 2008/0298386 A1* | | 12/2008 | Fiatal ............................ 370/449 |
| 2009/0253405 A1* | | 10/2009 | Yang ............................. 455/406 |

(Continued)

FOREIGN PATENT DOCUMENTS

| | | | |
|---|---|---|---|
| EP | 1901501 | 3/2008 | |
| WO | WO 00/41415 | 7/2000 | |
| WO | WO 2009020278 A1 * | 2/2009 | ......... H04N 7/17318 |

OTHER PUBLICATIONS

U.S. Appl. No. 11/544,938, Aug. 16, 2007, David Eliot Goldfarb.

(Continued)

*Primary Examiner* — James A Reagan
(74) *Attorney, Agent, or Firm* — Cozen O'Connor

(57) ABSTRACT

An apparatus includes a database of content and a content system. The database stores content related to a set of entities to be voted upon in a voting system, wherein there is at least one piece of content for each selection. The content system receives a vote of a user from the voting system and at least an identifier of a cellphone of the user and provides content related to the vote from the database to the cellphone. At least a portion of the content is playable on the cellphone.

12 Claims, 3 Drawing Sheets

(56) References Cited

U.S. PATENT DOCUMENTS

| | | | |
|---|---|---|---|
| 2009/0254934 A1* | 10/2009 | Grammens | H04H 60/33 725/14 |
| 2009/0298480 A1* | 12/2009 | Khambete et al. | 455/414.1 |
| 2010/0027961 A1* | 2/2010 | Gentile et al. | 386/52 |
| 2010/0035682 A1* | 2/2010 | Gentile et al. | 463/30 |
| 2010/0161398 A1* | 6/2010 | Albert et al. | 705/14.11 |
| 2010/0228740 A1* | 9/2010 | Cannistraro et al. | 707/748 |
| 2010/0257030 A1* | 10/2010 | Crocker | 705/12 |
| 2010/0312616 A1* | 12/2010 | Fein et al. | 705/12 |
| 2011/0238463 A1* | 9/2011 | Marchal | 705/12 |
| 2011/0264488 A1* | 10/2011 | Murayama et al. | 705/12 |

OTHER PUBLICATIONS

U.S. Appl. No. 11/768,989, Jul. 3, 2008, Jonathan William Medved.

* cited by examiner

VOTING SYSTEM WITH CONTENT

CROSS-REFERENCE TO RELATED APPLICATIONS

This application claims priority benefit from U.S. Provisional Patent Application 61/226,718, filed Jul. 19, 2009, which is incorporated herein by reference in its entirety.

FIELD OF THE INVENTION

The present invention relates to voting systems generally.

BACKGROUND OF THE INVENTION

Contest television usually shows a set of entertainers and asks the viewing audience to vote for their favorite entertainer. Depending on the system, viewers vote for the entertainer of their choice by calling a telephone number voting via an interactive voice response (IVR) system for the entertainer, or sending an SMS (short message service) to the telephone associated with the entertainer or sending an SMS to a central number with a text associated with the entertainer. The system adds up the votes (SMS's or phone calls) and awards the entertainer who received the most votes.

SUMMARY OF THE INVENTION

There is provided, in accordance with a preferred embodiment of the present invention, apparatus including a database of content and a content system. The database stores content related to a set of entities to be voted upon in a voting system. There is at least one piece of content for each entity. The content system receives a vote of a user for an entity and at least an identifier of a cellphone of the user from the voting system and provides content related to the voted entity from the database to the cellphone. At least a portion of the content is playable on the cellphone.

There is also provided, in accordance with a preferred embodiment of the present invention, a method implementable on a computing device. The method includes receiving a vote from a cellphone of a user with respect to one of a set of entities to be voted upon and at least an identifier of the cellphone and providing content related to the voted entity to the cellphone. At least a portion of the content is playable on the cellphone.

Further, in accordance with a preferred embodiment of the present invention, the vote is provided by SMS and the identifier is a caller identifier (caller ID) provided with the SMS.

Still further, in accordance with a preferred embodiment of the present invention, the entity is an entertainer, a band, an act or a candidate for an office.

Moreover, in accordance with a preferred embodiment of the present invention, the content includes at least a link to a storage location of the portion.

Additionally, the portion includes at least a multimedia clip. The multimedia clip can be a video ringtone playable upon a communications triggering event.

Further, in accordance with a preferred embodiment of the present invention, the content system includes a unit to read a profile of the user and to select the content as a function of the vote and the user profile.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
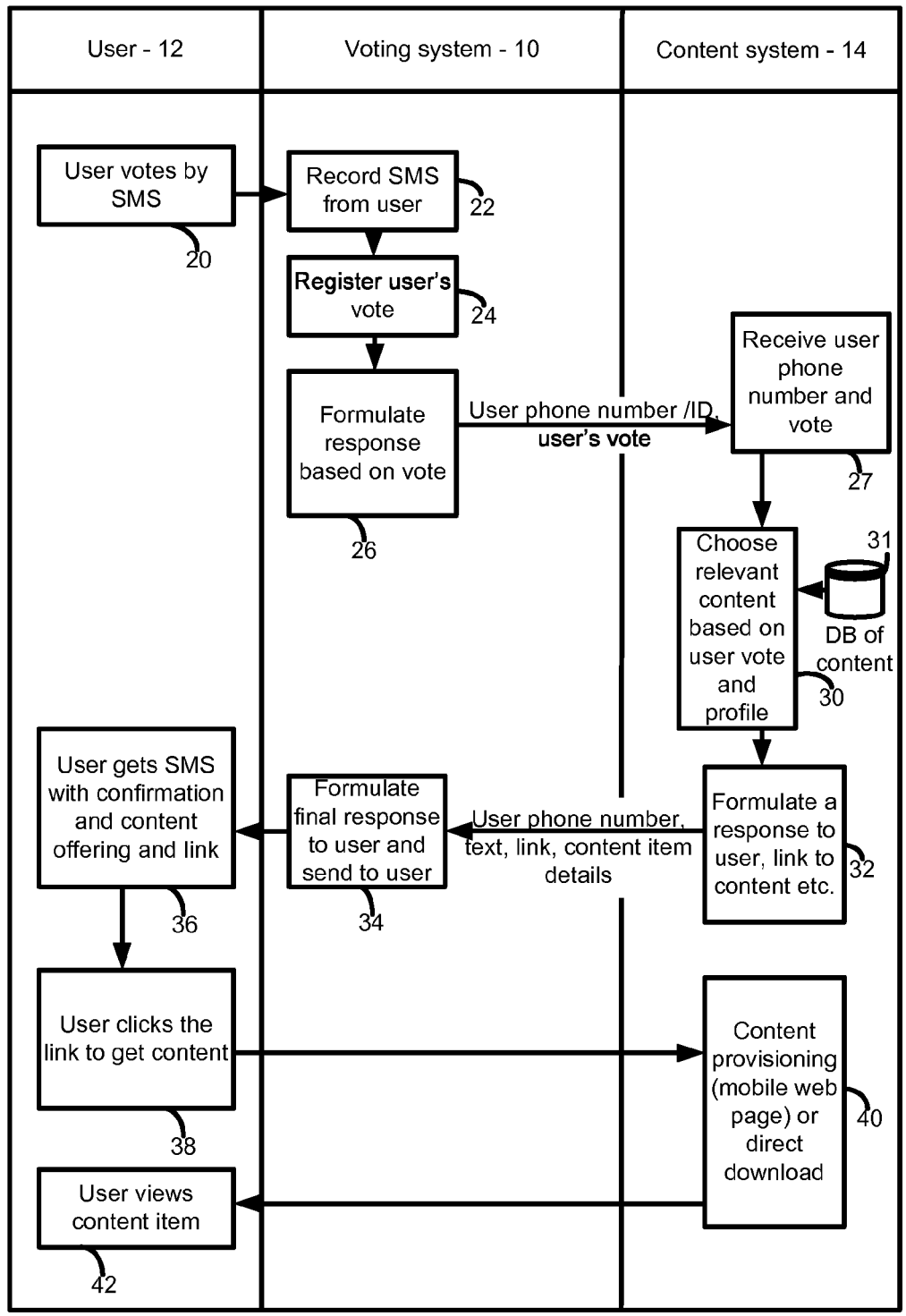
FIG. 1 is a flow diagram illustration of a method for receiving content related to a vote, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention may provide media content back to the user based upon the candidate for whom the user voted. Thus, if there are three entertainers, E1, E2 and E3, and the user voted for E3, the present invention may, upon receipt of the user's vote, provide content back to the user related to entertainer E3. The media content may be an audio clip, an image, a video clip, an animation, a slide show, etc., and may typically be of the entertainer and possibly of the entertainer performing the work for which the user voted.

In another embodiment, the user may vote for a candidate for an office and the media content may be the candidate's jingle or a clip from a speech, etc. It will be appreciated that content may be provided for any entity to be voted upon, whether candidate for office, entertainer, act, band, etc., and the media content may be any playable media content whether audio or multimedia clip where the multimedia clip includes a video clip, an animation, a slide show, etc.

Prior patent applications U.S. Ser. Nos. 11/544,938 and 11/768,989, assigned to the common assignee of the present application and incorporated herein by reference, describe a system to distribute media content selected by users for their friends or buddies.

Reference is now made to FIG. 1, which illustrates a first embodiment of the present invention. The system may comprise a voting system 10, communicating with a user 12, and a content system 14 communicating with voting system 10. Voting system 10 may be any suitable voting system, such as an SMS short code based platform, which may be configured to operate with content system 14, and may register user's votes as sent to them by SMS. In accordance with a preferred embodiment of the present invention, voting system 10 may also formulate responses to the user based on their vote using content system 14.

As can be seen in FIG. 1 to which reference is now made, user 12 may initially vote (step 20) by SMS, sending his/her vote to voting system 10. Voting system 10 may record (step 22) the SMS and may register (step 24) the vote. In step 26, voting system 10 may formulate a response to the user, by transmitting to content system 14 the user's phone number, or other identification, and the user's vote. Voting system 10 may determine the user's phone number from their "caller ID" information. In step 27, content system 14 may receive the user phone number and vote information.

Content system 14 may choose the relevant content from its content database 31 based on the user's vote. In step 32, content system 14 may formulate a response for the user, which may comprise the user's phone number, some text (possibly thanking the user for voting or some comment from the entertainer or candidate), a link to a URL where the content may be stored, and details of the content.

Voting system 10 may then formulate (step 34) a final response to the user and may send the response to the user, such as by SMS.

User 12 may receive (step 36) the SMS response and may click (step 38) on the enclosed link. This may take the user's cellphone to the URL of the content and/or to content system 14 which may then provide (step 40) the content to user 12's cellphone. The content provisioning may be by a mobile web page or by direct download. User 12 may then click (step 42) to view the content item.

Figure 2A:
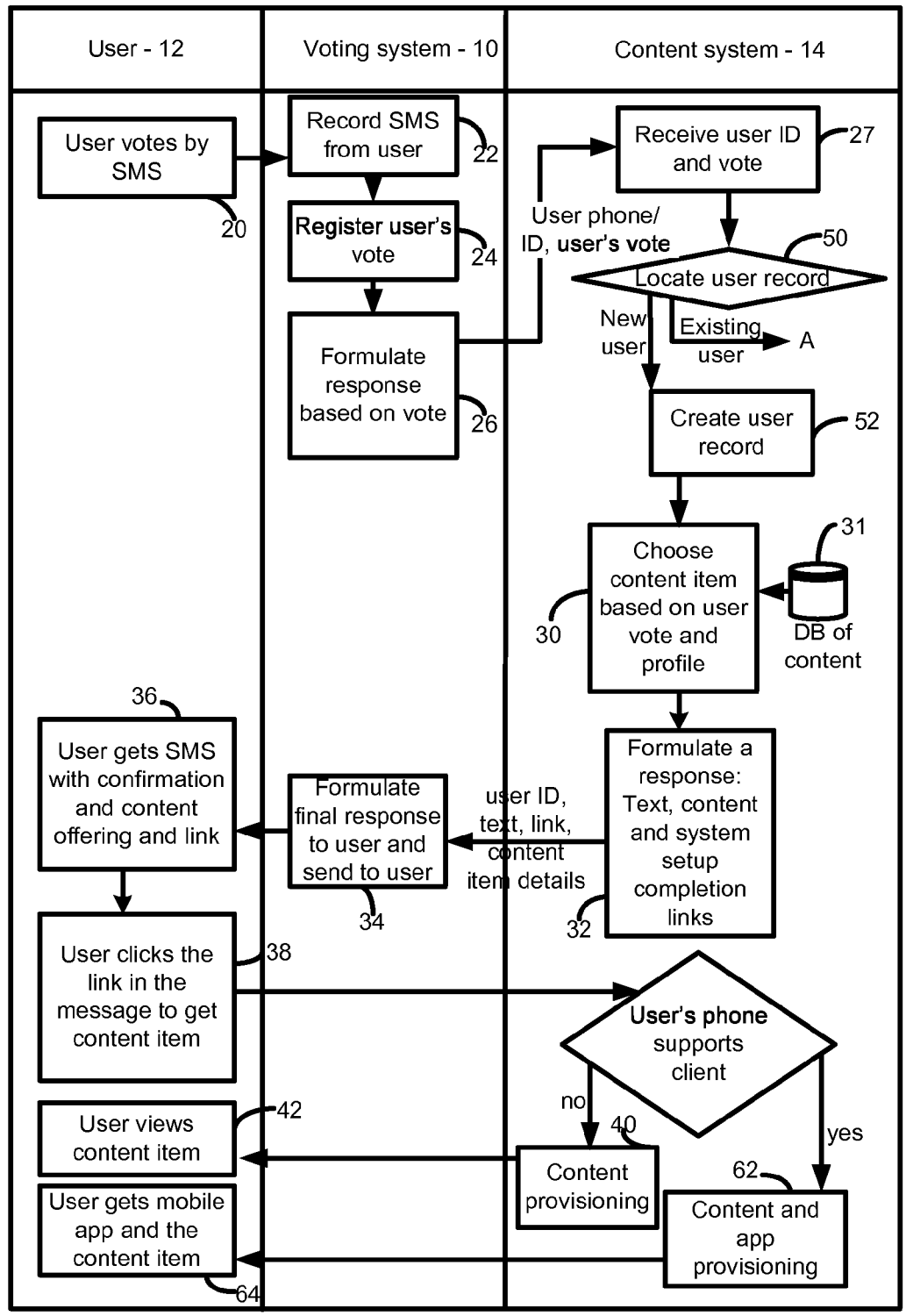
FIGS. 2A and 2B, taken together, is a flow diagram illustration of an alternative method for receiving content related to a vote, constructed and operative in accordance with an alternative preferred embodiment of the present invention.
Figure 2B:
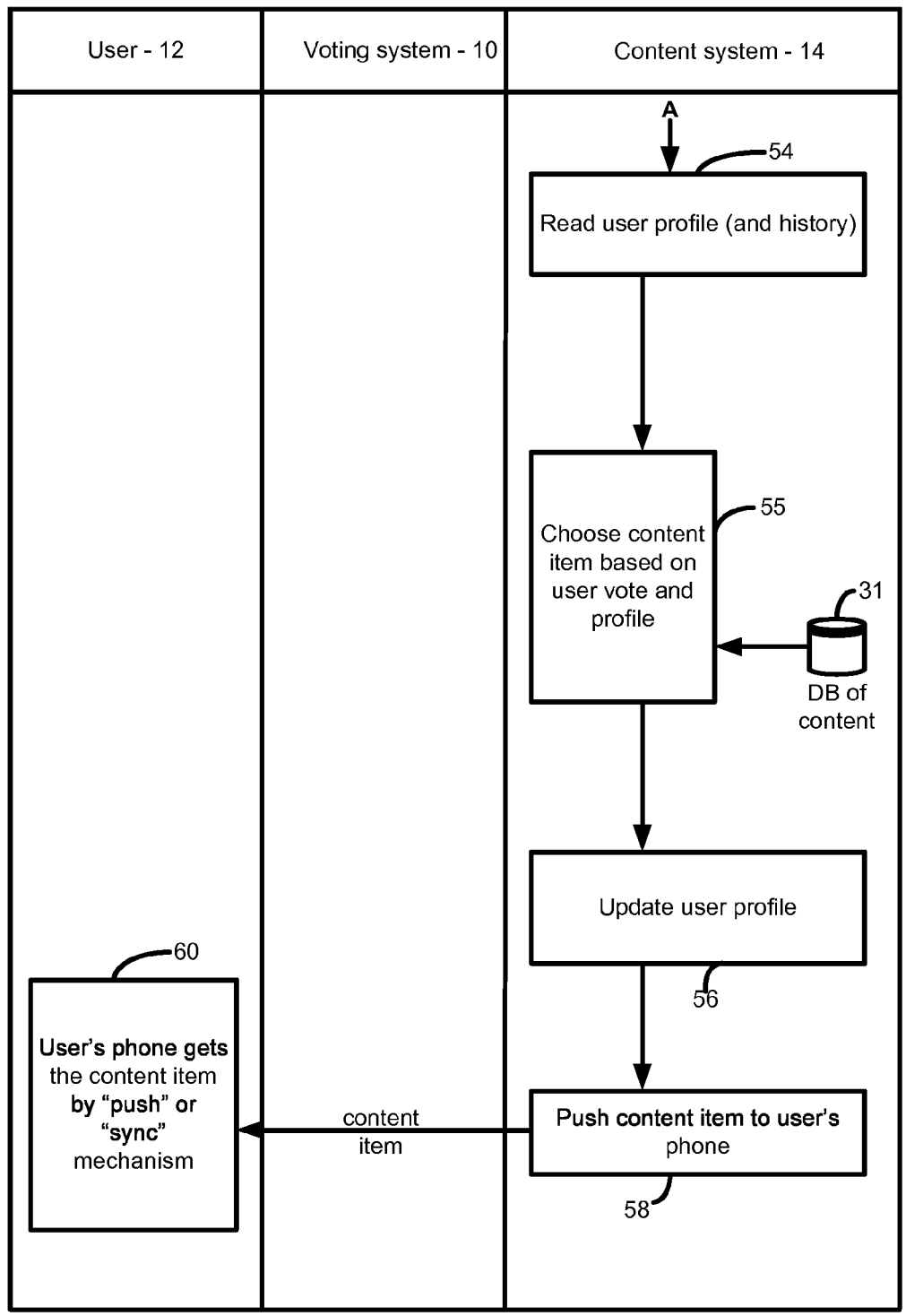

In an alternative embodiment, shown in FIGS. 2A and 2B to which reference is now made, content system 14 may be an Internet-based server that allows users to choose media clips to be distributed to their friends (or "buddies"). The media clips may act as "media ringtones" in which the clip is chosen by the calling party, to be displayed on the called handset. Such a system is described in U.S. Ser. No. 11/544,938. This patent application discusses a variety of other opportunities to present a media clip. For example at the end of a call between two handsets, each might see media clip: one chosen by the user of that phone, or one chosen by the user of the other phone, or one chosen by the server.

In this alternative embodiment, users may already be registered with content system 14. In this embodiment, the phone number may serve as the user's identification (ID) to content system 14. The operation of FIGS. 2A and 2B may be the same as FIG. 1 for unregistered users. However, when content system 14 may receive a vote, it may first determine (step 50) if the user is a registered user. If it isn't, content system 14 may create (step 52) a new user record and then continue as in FIG. 1 (steps 30 and 32).

If the user is a registered user, content system 14 may read (step 54) the user's profile. If the entertainer or candidate has multiple versions of their content, content system 14 may also select (step 55) the appropriate one based on the user's profile. For example, the versions may be appropriate for different age ranges, or past voting and content acquisition by this user, etc. Content system 14 may update (step 56) the user's profile based on this vote. Content system 14 may then push (step 58) the selected content item to the user's phone. User 12 may then receive the content item, either through a push or via a synchronization operation. For the latter and as described in U.S. Ser. No. 11/544,938, the content item may play either upon receipt or may be set as the user's default ringtone, such that it may play upon an external communications triggering event, such as an incoming or outgoing phone call.

FIGS. 2A and 2B shows a further alternative for unregistered users. If their cellphones are of a kind which can support the mobile client of content system 14 (such as is described in U.S. Ser. No. 11/544,938), then content system 14 may provide (steps 62 and 64) them with the mobile client as well as with the content item, such that the content item may play either upon receipt or may be set as the user's default ringtone. Once again, the content provisioning may be by a mobile web page or by direct download.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. Apparatus in communication with a voting system which receives votes from a plurality of cell phones for a set of entities, the voting system comprising:
   a recorder configured to record a communication from a cell phone of a user the communication having at least an identifier of the cell phone of the user and a vote of said user for a voted entity;
   a registration unit configured to register the user's vote and tabulate votes from the plurality of cell phones for the set of entities; and
   a forwarding unit configures to formulate a response to the user and send the formulated response to the user; and
   the apparatus comprising:
   a database of content storage related to said set of entities to be voted upon in said voting system, wherein there is at least one piece of content for each entity and wherein specific media content is associated with a respective entity;
   a content unit to receive from said voting system at least the identifier of the cell phone of the user and the vote of said user for the voted entity;
   a response formulator configured to provide an identifier to the cell phone of the user via the forwarding unit to enable the specific media content related to said voted entity to be downloaded from said database to said cell phone of said user;
   a unit to read a profile of said user and to select the specific media content as a function of the vote and said the profile; and
   a content provider that provides the specific media content to the cell phone of said user based on the identifier,
   wherein at least a portion of said specific media content is playable on said cell phone.

2. The apparatus according to claim 1 wherein said vote is provided by SMS and wherein said identifier is a caller identifier (caller ID) provided with said SMS.

3. The apparatus according to claim 1 and wherein said entity is one of:
   an entertainer, a band, an act and a candidate for an office.

4. The apparatus according to claim 1 and wherein said media content comprises at least a link to a storage location of said portion.

5. The apparatus according to claim 1 and wherein said portion comprises at least a multimedia clip.

6. The apparatus according to claim 5 and wherein said multimedia clip is a video ringtone playable upon a communications triggering event.

7. A method implementable on a computing device in communication with a voting system which receives votes for candidates from a plurality of cell phones of users, the method comprising:

recording a communication from a cell phone of a user the communication having at least an identifier of the cell phone of the user and a vote of said user for a candidate;

registering the user's vote and tabulating votes from the plurality of cell phones for the candidates; and formulating a response to the user and sending the formulated response to the user; and providing a database of content related to said candidates, wherein there is at least one piece of content for each candidate;

associating specific media content a respective candidate;

receiving from said voting system at least the identifier of said cell phone of said user and the vote of said user for a voted candidate;

reading a profile of said user and selecting said media content as a function of said vote and said user profile;

enabling the specific media content related to said voted candidate to be downloaded from said database to said cell phone of said user by providing a content identifier to the cell phone of said user; and providing the specific media content to the cell phone of said user based on the content identifier, wherein at least a portion of said media content is playable on said cell phone.

8. The method according to claim 7 wherein said vote is provided by SMS and wherein said identifier is a caller identifier (caller ID) provided with said SMS.

9. The method according to claim 7 and wherein said entity is one of:

an entertainer, a band, an act and a candidate for an office.

10. The method according to claim 7 and wherein said media content comprises at least a link to a storage location of said portion.

11. The method according to claim 7 and wherein said portion comprises at least a multimedia clip.

12. The method according to claim 11 and wherein said multimedia clip is a video ringtone playable upon a communications triggering event.

* * * * *